US008814155B2

(12) United States Patent
Prins

(10) Patent No.: US 8,814,155 B2
(45) Date of Patent: Aug. 26, 2014

(54) C FRAME CLAMPING DEVICE HAVING NON-ROTATING ANVILS

(75) Inventor: Etienne Peter Prins, Sarasota, FL (US)

(73) Assignee: D'Arcy H. Lorimer, Pismo Beach, CA (US)

( * ) Notice: Subject to any disclaimer, the term of this patent is extended or adjusted under 35 U.S.C. 154(b) by 607 days.

(21) Appl. No.: 13/136,186

(22) Filed: Jul. 26, 2011

(65) Prior Publication Data

US 2013/0026692 A1 Jan. 31, 2013

(51) Int. Cl.
*B23P 19/04* (2006.01)

(52) U.S. Cl.
USPC .......................................... 269/249; 269/143

(58) Field of Classification Search
CPC ........ B25B 5/067; B25B 5/082; B25B 5/101; B25B 5/125
USPC .............. 269/143, 429, 246, 3, 6, 95; 29/276, 29/270, 278, 257
See application file for complete search history.

(56) References Cited

U.S. PATENT DOCUMENTS 5,586,378 A * 12/1996 Smith ............................ 29/257
6,123,326 A * 9/2000 Kleinbongartz .............. 269/215
6,233,803 B1 * 5/2001 Rose .......................... 29/243.53
8,282,088 B2 * 10/2012 Janson et al. ..................... 269/6
2013/0026692 A1 * 1/2013 Prins ............................ 269/249

* cited by examiner

*Primary Examiner* — Lee D Wilson
(74) *Attorney, Agent, or Firm* — D'Archy H. Lorimer; Lorimer Labs

(57) ABSTRACT

A clamping device having a C shaped frame and anvils which cannot rotate while applying a clamping force is disclosed. One anvil is affixed to the C shaped frame while the second anvil is mounted to a drive tube which telescopes within a guide tube fixed to the frame. The conformal shapes of the guide and drive tubes prevent rotation as compressive force is applied to a work piece placed between the two anvils.

15 Claims, 8 Drawing Sheets

400
204
202
206
402
414
416
404
406
216
212

401
216
406a
406b
212
404
402
212
216
414
403

C FRAME CLAMPING DEVICE HAVING NON-ROTATING ANVILS

BACKGROUND OF THE INVENTION

1. Field of the Invention

The invention relates to clamping devices wherein the work piece is held between two adjustable anvils. Specifically, the invention comprises a "C clamp" having two adjustable anvils that maintain a fixed, non-rotating relationship as the work piece is clamped between them.

2. Description of the Related Art

C clamps are commonly used hand tools used to hold or immobilize a work piece between two adjustable anvil surfaces. Please refer to FIG. 1 (prior art). In C clamps of the prior art, one anvil 104 is rigidly attached to the C shaped frame 102, and the movable anvil 106 is mounted on a screw device 110 which rotates via handle 112 to direct the movable anvil 106 surface toward the fixed anvil 104. The movable anvil 106 is typically mounted on a ball joint 108 which allows the anvil 106 to stop rotating after contact with the work piece is engaged, theoretically allowing compression of the work piece without transferring a rotational torque. However, in actual usage, the friction generated by the increased clamping pressure causes the ball joint to freeze up, imparting torque to the work piece. This often causes the clamp to "walk" off the work piece and limits the amount of compression force that can be applied.

What is needed is an improved clamping device wherein both anvil surfaces remain fixed, maintaining a non rotating relationship as the work piece is clamped between them.

SUMMARY OF THE INVENTION

It is an object of the present invention to provide a clamping device including a C shaped frame, the C shaped frame terminating in a first end surface and a second end surface, the first end surface being oriented approximately 90 degrees from the second end surface; a fixed anvil, the fixed anvil attached to the first end surface of the C shaped frame; a guide tube having a rectangular shape, the guide tube having a first open end, a second open end, an inner surface and an outer surface, the outer surface of the guide tube attached to the second end surface of the C shaped frame; a drive tube having a rectangular shape, a first open end, a second open end, and an outer surface, the outer surface of the drive tube conformal in shape with the inner surface of the guide tube, the drive tube residing within the guide tube, a portion of the drive tube extending through the first open end of the guide tube, the outer surface of the drive tube in contact with the inner surface of the guide tube in at least two opposing locations. The invention also provides a movable anvil attached to and enclosing the first open end of the drive tube; a threaded collar attached to and enclosing the second open end of the drive tube, the threaded collar having a threaded bore; a screw device having a threaded portion extending through and engaging the threaded bore of the threaded collar; a retaining collar, attached to and enclosing the second open end of the guide tube, the retaining collar operative to hold a position of said screw device fixed relative to said guide tube while allowing free rotation of said threaded portion of said screw device within said threaded bore of said threaded collar.

It is another object of the present invention to provide a clamping device including a C shaped frame, the C shaped frame terminating in a first end surface and a second end surface, the first end surface being oriented approximately 90 degrees from the second end surface; a fixed anvil, the fixed anvil attached to the first end surface of the C shaped frame; a guide tube having a hexagonal shape, the guide tube having a first open end, a second open end, an inner surface and an outer surface, the outer surface of the guide tube attached to the second end surface of the C shaped frame; a drive tube having a hexagonal shape, a first open end, a second open end, and an outer surface, the outer surface of the drive tube conformal in shape with the inner surface of the guide tube, the drive tube residing within the guide tube, a portion of the drive tube extending through the first open end of the guide tube, the outer surface of the drive tube in contact with the inner surface of the guide tube in at least two opposing locations. The invention also provides a movable anvil attached to and enclosing the first open end of the drive tube; a threaded collar attached to and enclosing the second open end of the drive tube, the threaded collar having a threaded bore; a screw device having a threaded portion extending through and engaging the threaded bore of the threaded collar; a retaining collar, attached to and enclosing the second open end of the guide tube, the retaining collar operative to hold a position of said screw device fixed relative to said guide tube while allowing free rotation of said threaded portion of said screw device within said threaded bore of said threaded collar.

BRIEF DESCRIPTION OF THE DRAWINGS

The present invention will be better understood when consideration is given to the following detailed description thereof Such description makes reference to the annexed drawings, wherein.

DETAILED DESCRIPTION OF THE PREFERRED EMBODIMENTS

Figure 1:
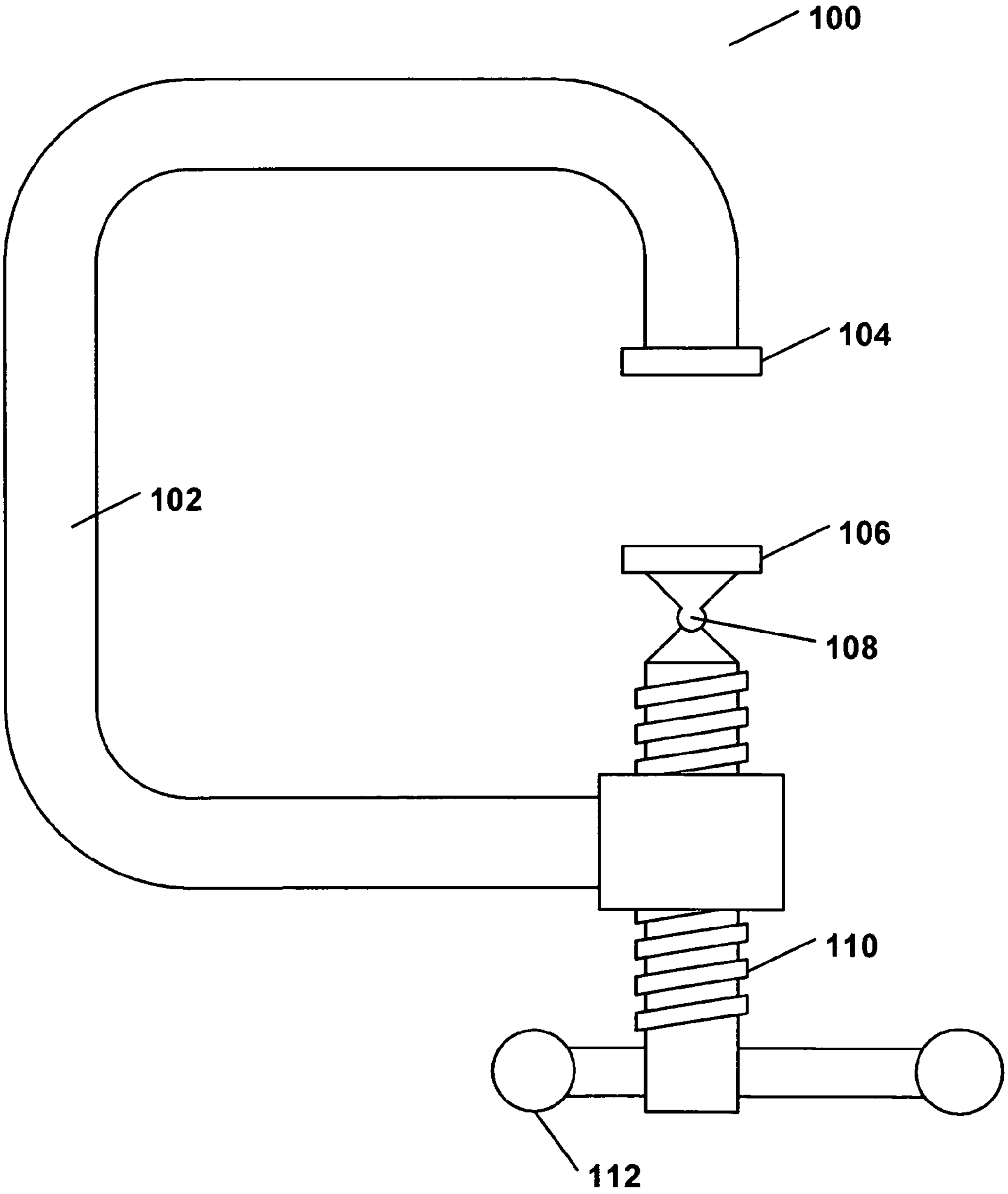
Figure 1 (Prior Art)
FIG. 1 (Prior Art) is a side view of a C clamp of the prior art.

FIG. 1 (Prior Art) is a side view 100 of a C clamp of the prior art. Details have been covered in the Background section of this disclosure above.

Figure 2:
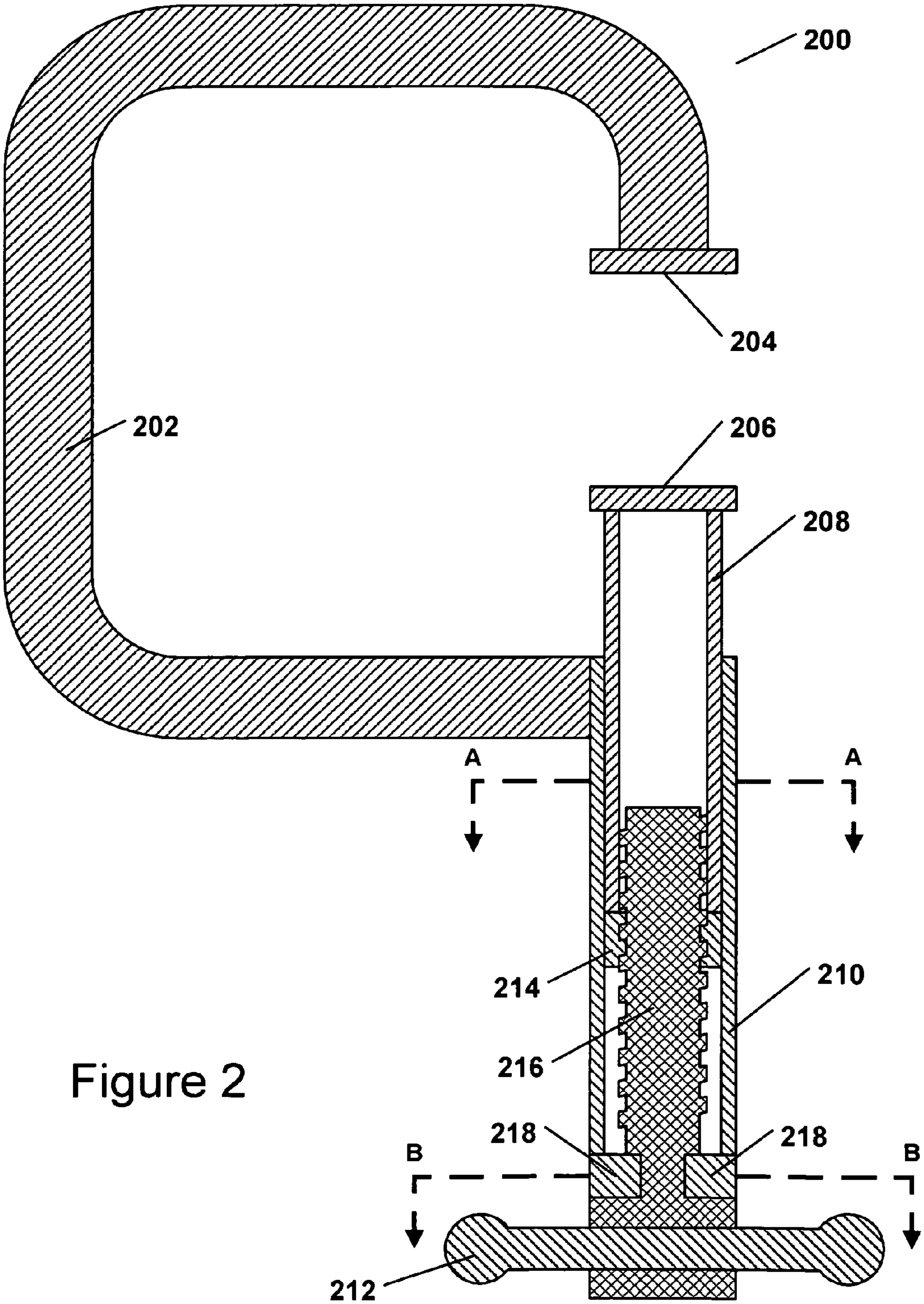
FIG. 2 is a cross section view of a clamping device in accordance with embodiments of the present invention.

FIG. 2 is a cross section view 200 of a clamping device in accordance with embodiments of the present invention. The present invention includes an outer guide tube 210 attached to C shaped frame 202. A fixed anvil 204 is attached to frame 202. A movable anvil 206 and threaded collar 214 are attached to drive tube 208. Drive screw device 216 engages threaded collar 214 and is held in place by retaining collar 218 attached to outer guide tube 210. Anvil 206 is moved relative to anvil 204 by the rotation of screw device 216 via handle 212. Rotation of anvil 206 relative to anvil 204 is prevented by the shape and conformal contact of guide tube 210 with drive tube 208. The drive tube 208 "telescopes" out of guide tube 210 as torque is applied to handle 212. As a work piece (not shown) is clamped between fixed anvil 204 and movable anvil 206, no rotational torque is applied to the work piece, allowing the maximum amount of clamping force to be applied without having the clamp "walk off" the work piece. Please see the embodiments disclosed below.

The outer guide tube and fixed anvil 204 are attached to frame 202 preferably by welding, but other process well known to those skilled in the art, such as glues, screws or rivets (not shown) may also be employed. Alternatively, anvil 204 may be an integral part of frame 202 (as opposed to two attached parts) via a casting or machining. Movable anvil 206 and threaded collar 214 are attached to drive tube 208 preferably by welding, but the other techniques mentioned above may also be applied. Further, either the anvil 206 or the threaded collar may be integrally cast (or machined from bar stock) as part of drive tube 208. Retaining collar 218 is attached to outer guide tube preferably by welding.

Figures 3A, 3B, 3C:
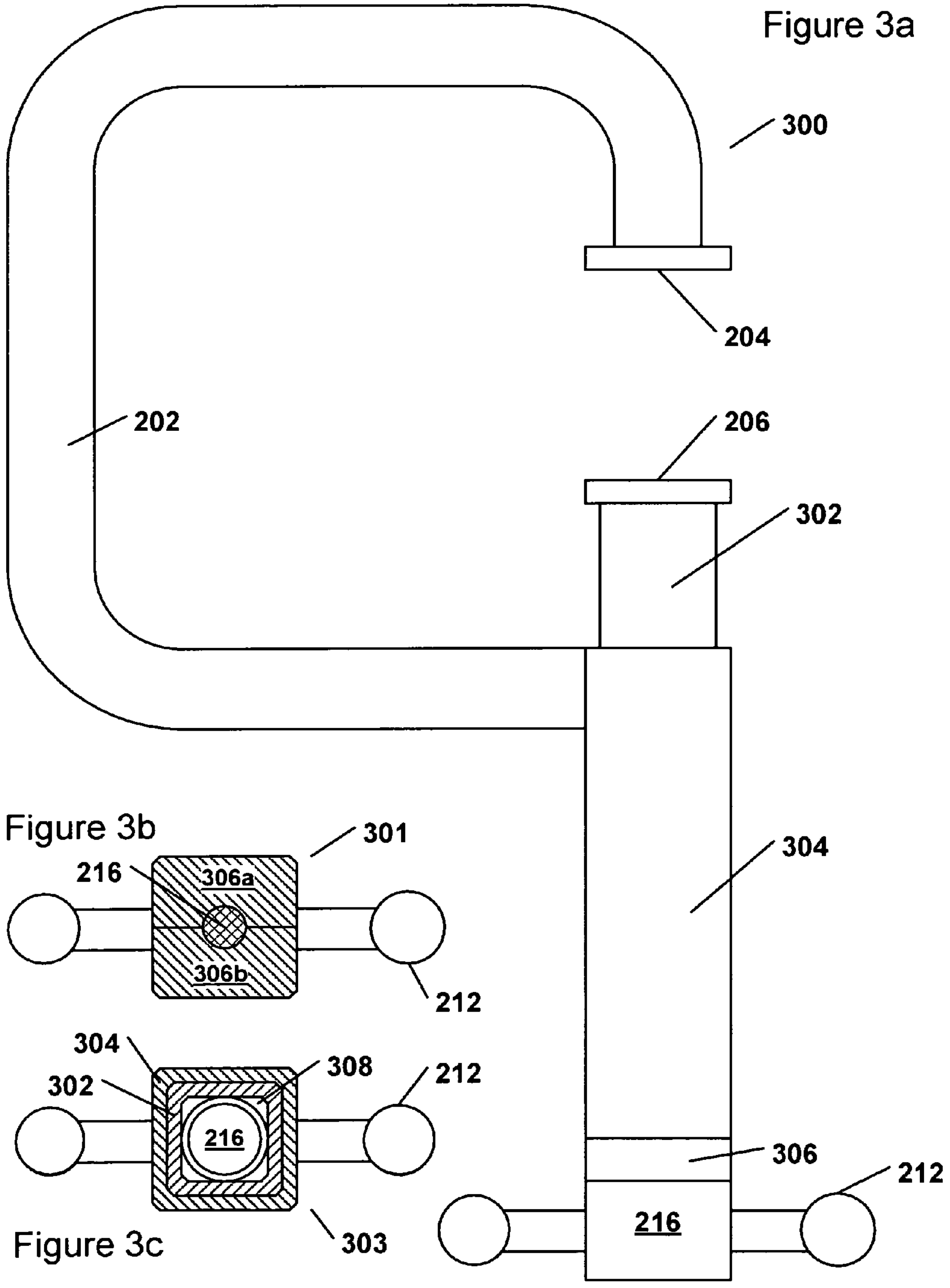
FIG. 3*a* is a side view of a clamping device in accordance with a first embodiment of the present invention.
FIG. 3*b* is a partial cross section view through section B-B of FIG. 2, in accordance with the first embodiment of the present invention.
FIG. 3*c* is a partial cross section view though section A-A of FIG. 2, in accordance with the first embodiment of the present invention.
Figure 3D:
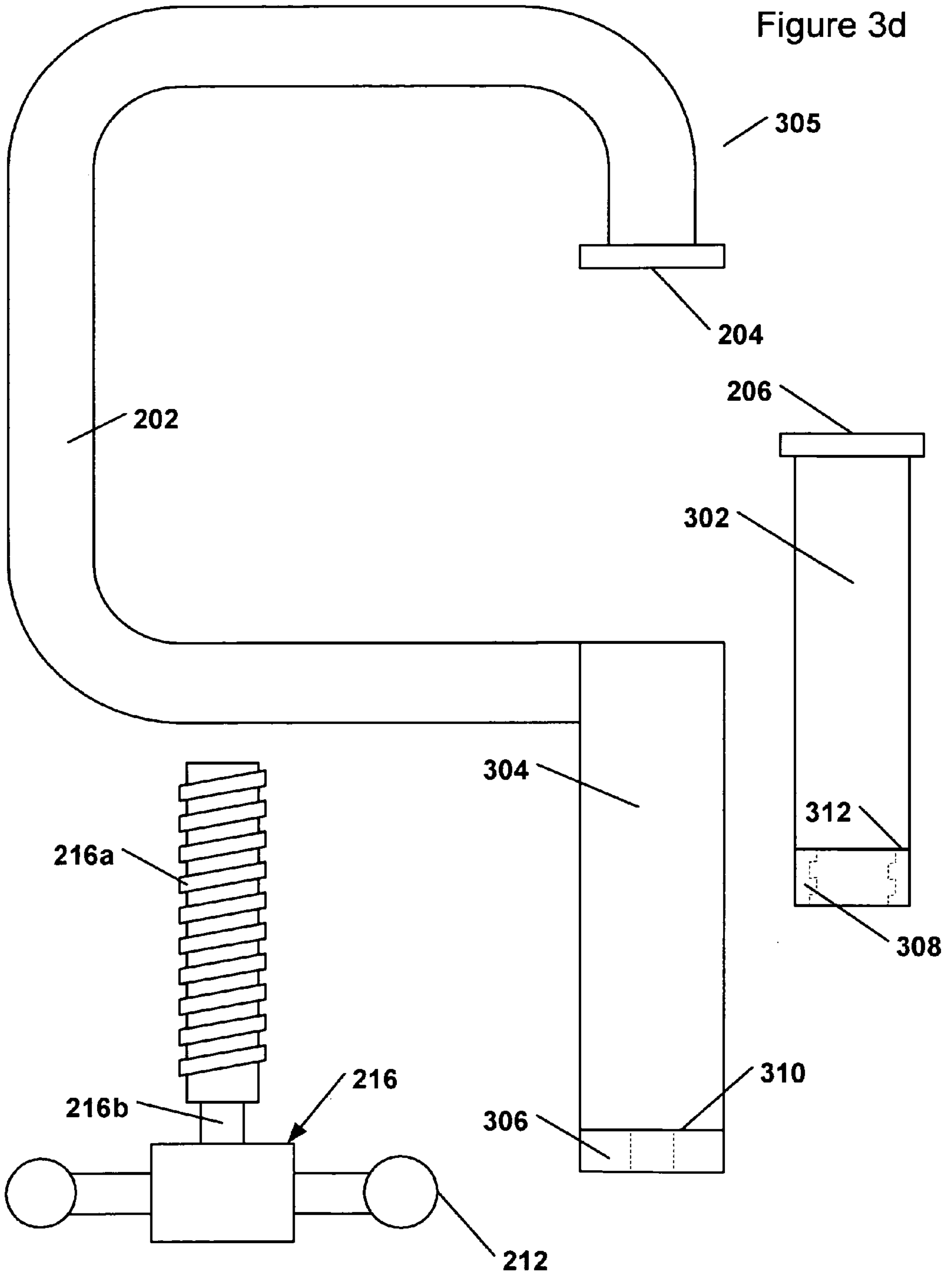
FIG. 3*d* is a side view of the component parts of the clamping device of FIGS. 3*a-c,* in accordance with the first embodiment of the present invention.

FIG. **3*a* is a side view 300 of a clamping device in accordance with a first embodiment of the present invention. In this embodiment drive tube 302, guide tube 304 and retaining collar 306 have a square shape. The conformal fitment of the drive tube 302 within guide tube 304 prevent rotation of anvil 206 as anvil 206 is moved toward anvil 204. FIG. 3*b* is a partial cross section view 301 through section B-B of FIG. 2. Retaining collar 306 is composed of two parts 306*a* and 306*b*, to allow assembly of screw device 216 within the guide tube 304 and drive tube 302. Retaining collar 306, while fixed to guide tube 304, allows free rotation of screw device 216. FIG. 3*c* is a partial cross section view 303 though section A-A of FIG. 2. In this view, the relationships of the guide tube 304, drive tube 302, and drive screw device 216 are shown. A portion of threaded collar 308 is also visible. FIG. 3*d* is a side view 305 of the component parts of the clamping device of FIGS. 3*a-c*. Screw device 216 has a threaded portion 216*a* that engages threaded collar 308, threaded collar 308 being affixed to drive tube 302 at joint (surface) 312. Threads may be "left hand" or "right hand", depending on the desired direction of rotation. For example, a left hand thread would be desirable to produce a clamping action of the anvils with a clockwise rotation of handle 212, as viewed from the bottom of the clamp. Screw device 216 is fabricated to provide a recessed bearing surface 216*b* that allows free rotation of device 216, while also holding the screw device 216 in position within guide tube 304 via engagement with retaining collar 306. Retaining collar 306 (306*a* and 306*b*) are affixed to guide tube 304 at joint (surface) 310**.

Figures 4A, 4B, 4C:
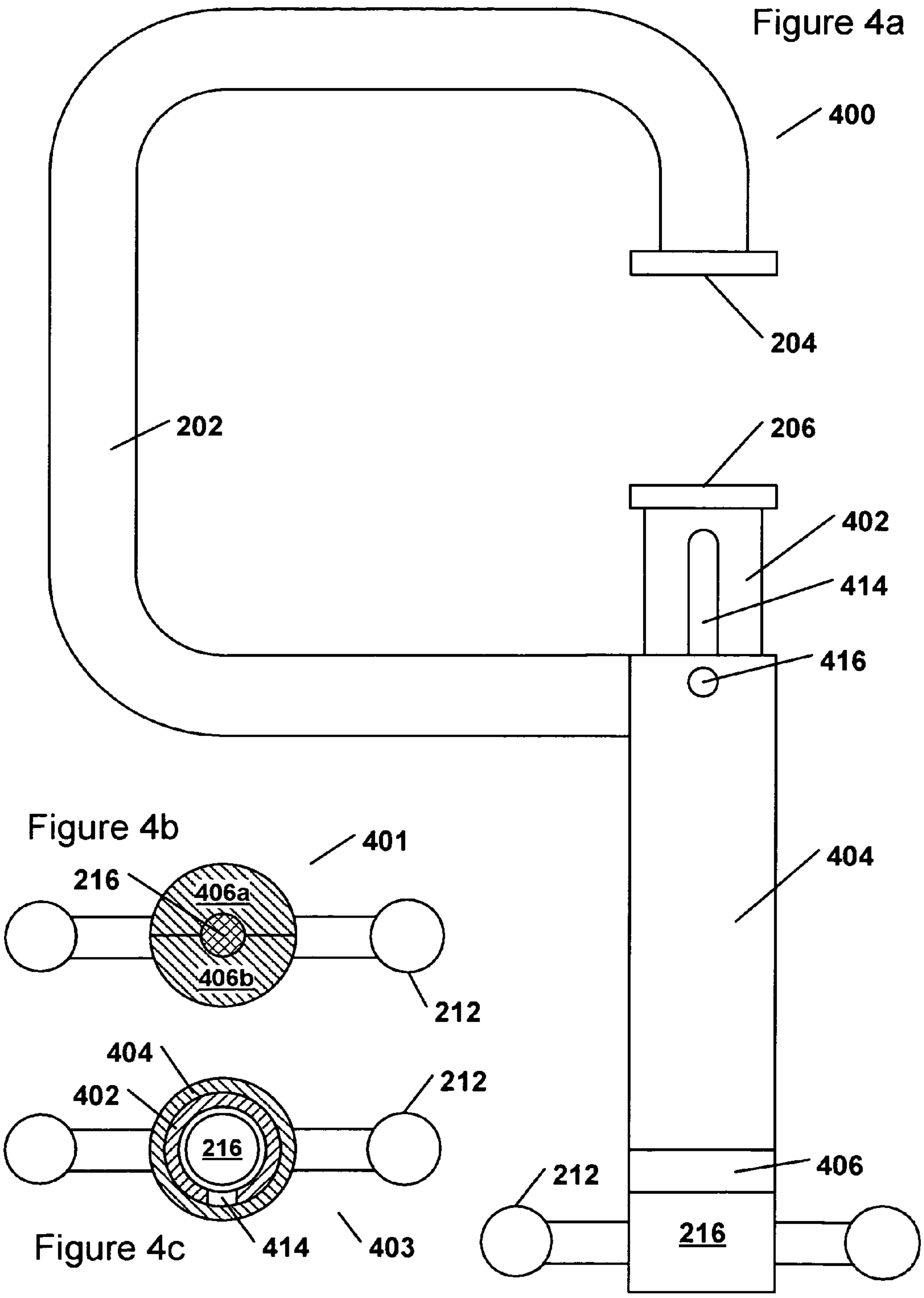
FIG. 4*a* is a side view of a clamping device in accordance with a second embodiment of the present invention.
FIG. 4*b* is a partial cross section view through section B-B of FIG. 2, in accordance with the second embodiment of the present invention.
FIG. 4*c* is a partial cross section view though section A-A of FIG. 2, in accordance with the second embodiment of the present invention.
Figure 4D:
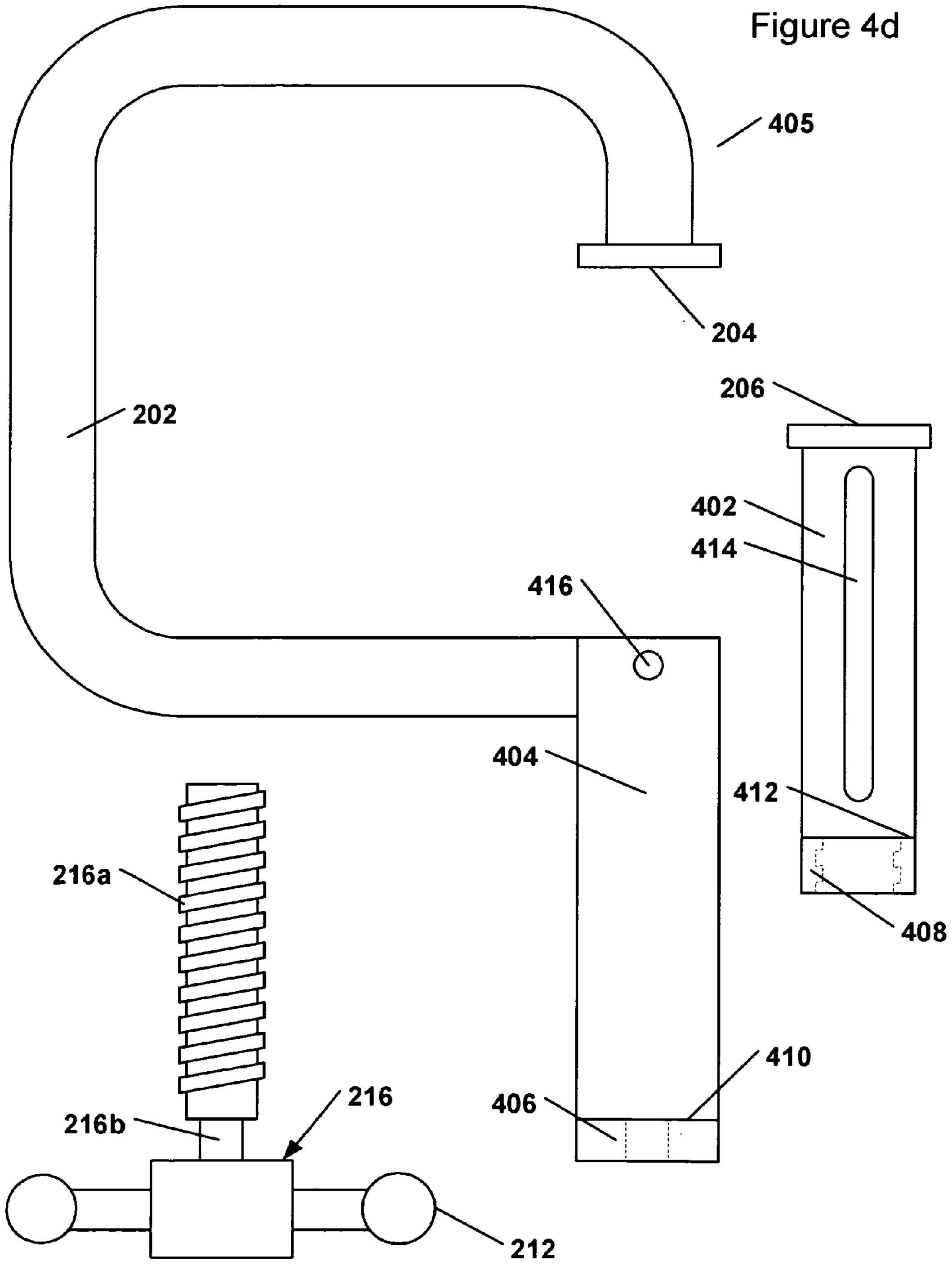
FIG. 4*d* is a side view of the component parts of the clamping device of FIGS. 4*a-c,* in accordance with the second embodiment of the present invention.

FIG. **4*a* is a side view 400 of a clamping device in accordance with a second embodiment of the present invention. In this embodiment drive tube 402, guide tube 404 and retaining collar 406 have a circular shape. Rotation of the drive tube 402 within guide tube 404 is prevented by a pin 416, inserted through the wall of guide tube 404, through a slot 414 fabricated within guide tube 402. Typically, pin 416 is affixed to guide tube 404 in such a manner as to prevent loosening during operation. Pin 416, while preventing rotation of the drive tube 402 relative to guide tube 404, allows unrestricted extension and contraction of the drive tube within the guide tube. FIG. 4*b* is a partial cross section view 401 through section B-B of FIG. 2. Retaining collar 406 is composed of two parts 406*a* and 406*b*, to allow assembly of screw device 216 within the guide tube 404 and drive tube 402. Retaining collar 406 is also fabricated in such a manner as to allow free rotation of screw device 216 within the retaining collar 406. FIG. 4*c* is a partial cross section view 403 though section A-A of FIG. 2. FIG. 4*d* is a side view 405 of the component parts of the clamping device of FIGS. 4*a-c*. Screw device 216 has a threaded portion 216*a* that engages threaded collar 408, threaded collar 408 being affixed to drive tube 402 at joint (surface) 412. Threads may be "left hand" or "right hand", depending on the desired direction of rotation. Screw device 216 is fabricated to provide a recessed bearing surface 216*b* that allows free rotation of device 216, while also holding the screw device 216 in position within guide tube 404 via engagement with retaining collar 406. Retaining collar 406 (406*a* and 406*b*) are affixed to guide tube 404 at joint (surface) 410**.

Figures 5A, 5B, 5C:
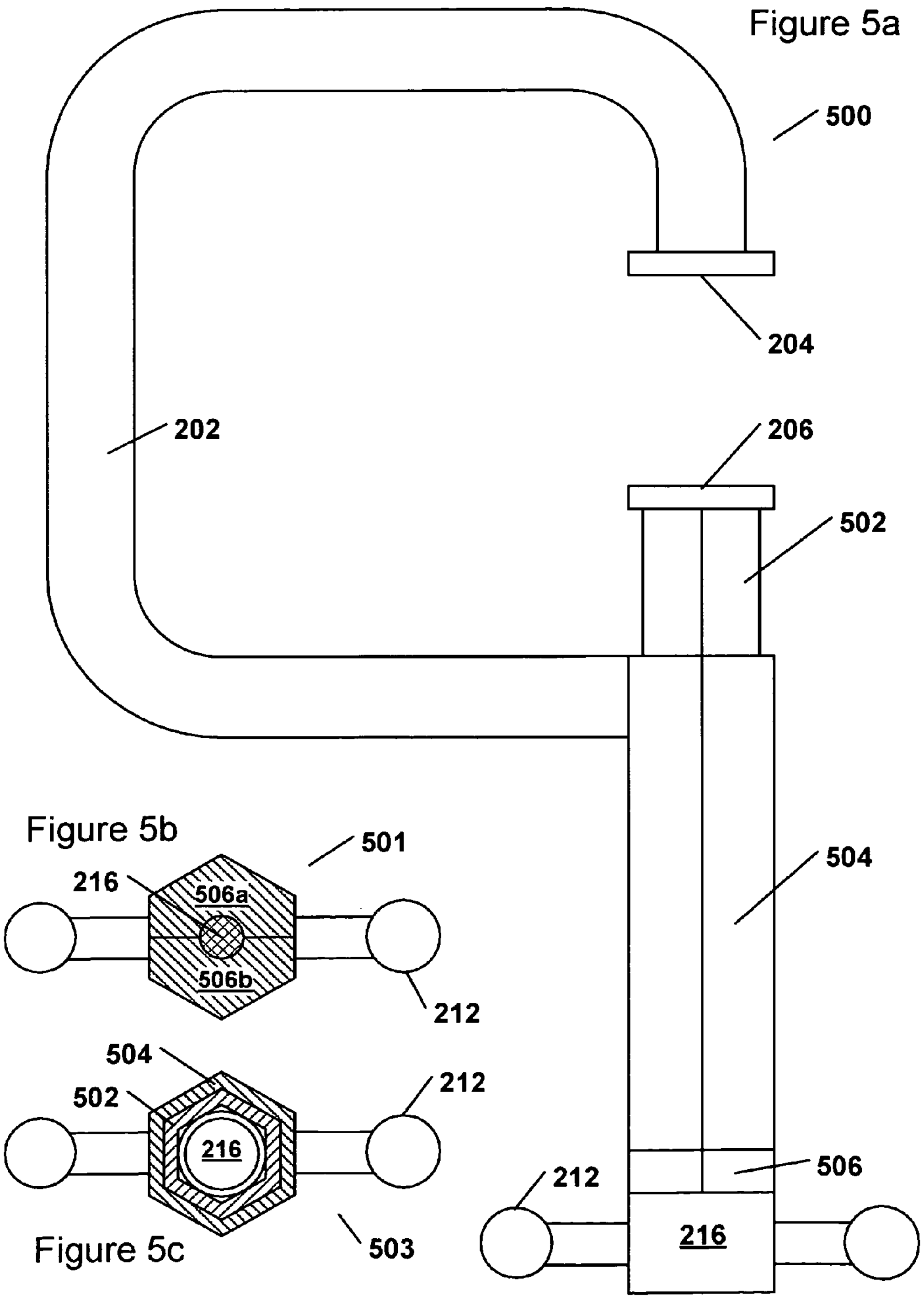
FIG. 5*a* is a side view of a clamping device in accordance with a third embodiment of the present invention.
FIG. 5*b* is a partial cross section view through section B-B of FIG. 2, in accordance with the third embodiment of the present invention.
FIG. 5*c* is a partial cross section view though section A-A of FIG. 2, in accordance with the third embodiment of the present invention.
Figure 5D:
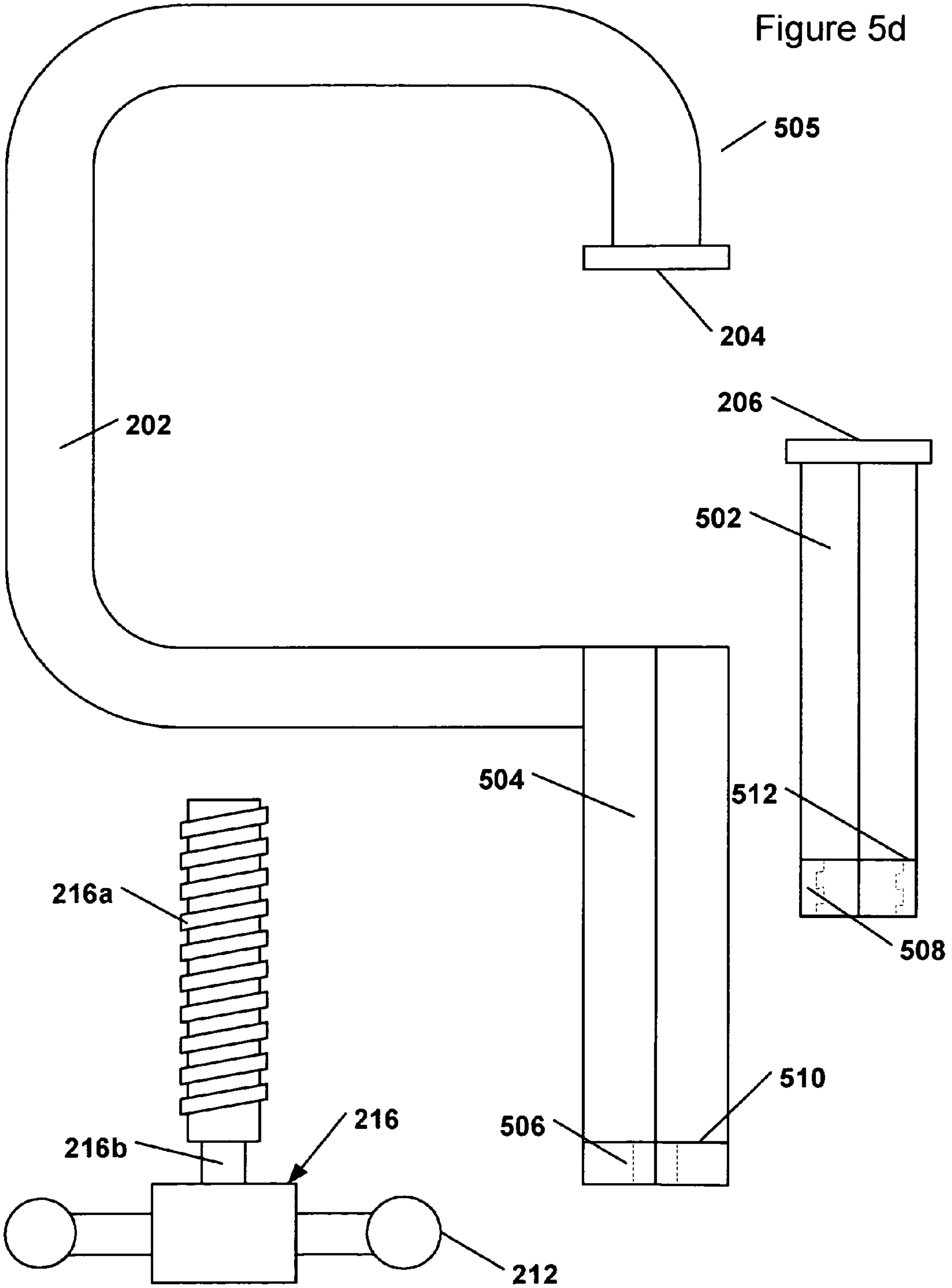
FIG. 5*d* is a side view of the component parts of the clamping device of FIGS. 5*a-c,* in accordance with the third embodiment of the present invention.

FIG. **5*a* is a side view 500 of a clamping device in accordance with a third embodiment of the present invention. In this embodiment drive tube 502, guide tube 504 and retaining collar 506 have a hexagonal shape. The conformal fitment of the drive tube 502 within guide tube 504 prevent rotation of anvil 206 as anvil 206 is moved toward anvil 204. FIG. 5*b* is a partial cross section view 501 through section B-B of FIG. 2. Retaining collar 506 is composed of two parts 506*a* and 506*b*, to allow assembly of screw device 216 within the guide tube 304 and drive tube 302. Retaining collar 506, while fixed to guide tube 504, allows free rotation of screw device 216. FIG. 5*c* is a partial cross section view 503 though section A-A of FIG. 2. FIG. 5*d* is a side view 505 of the component parts of the clamping device of FIGS. 5*a-c*. Screw device 216 has a threaded portion 216*a* that engages threaded collar 508, threaded collar 508 being affixed to drive tube 502 at joint (surface) 512. Threads may be "left hand" or "right hand", depending on the desired direction of rotation. Screw device 216 is fabricated to provide a recessed bearing surface 216*b* that allows free rotation of device 216, while also holding the screw device 216 in position within guide tube 504 via engagement with retaining collar 506. Retaining collar 506 (506*a* and 506*b*) are affixed to guide tube 504 at joint (surface) 510**.

The present invention is not limited by the previous embodiments heretofore described. Rather, the scope of the present invention is to be defined by these descriptions taken together with the attached claims and their equivalents.

What is claimed is:

1. A clamping device comprising:

a C shaped frame, said C shaped frame terminating in a first end surface and a second end surface, said first end surface being oriented approximately 90 degrees from said second end surface;

a fixed anvil, said fixed anvil attached to said first end surface of said C shaped frame;

a guide tube, said guide tube having a rectangular shape, said guide tube having a first open end, a second open end, an inner surface and an outer surface, said outer surface of said guide tube attached to said second end surface of said C shaped frame;

a drive tube, said drive tube having a rectangular shape, said drive tube having a first open end, a second open end, and an outer surface, said outer surface of said drive tube conformal in shape with said inner surface of said guide tube, said drive tube residing within said guide tube, a portion of said drive tube extending through said first open end of said guide tube, said outer surface of said drive tube in contact with said inner surface of said guide tube in at least two opposing locations;

a movable anvil, said movable anvil attached to and enclosing said first open end of said drive tube;

a threaded collar, said threaded collar attached to and enclosing said second open end of said drive tube, said threaded collar having a threaded bore;

a screw device, said screw device having a threaded portion extending through and engaging said threaded bore of said threaded collar;

a retaining collar, said retaining collar attached to and enclosing said second open end of said guide tube, said retaining collar operative to hold a position of said screw device fixed relative to said guide tube while allowing free rotation of said threaded portion of said screw device within said threaded bore of said threaded collar.

2. The clamping device as recited in claim 1, wherein said guide tube and said drive tube have essentially a square shape.

3. The clamping device as recited in claim 1, wherein said threaded portion of said screw device has left hand threads, operative to extend said movable anvil toward said fixed anvil with a clockwise rotation of said screw device.

4. The clamping device as recited in claim 1, wherein said threaded portion of said screw device has right hand threads, operative to extend said movable anvil toward said fixed anvil with a counter clockwise rotation of said screw device.

5. The clamping device as recited in claim 1, wherein said retaining collar is composed of two essentially identical halves.

6. The clamping device as recited in claim 5, wherein said retaining collar is welded to said guide tube.

7. The clamping device as recited in claim 1, wherein said fixed anvil and said guide tube are welded to said C shaped frame.

8. The clamping device as recited in claim 1, wherein said fixed anvil, said C shaped frame, and said guide tube are machined from a single block of metal.

9. A clamping device comprising:

a C shaped frame, said C shaped frame terminating in a first end surface and a second end surface, said first end surface being oriented approximately 90 degrees from said second end surface;

a fixed anvil, said fixed anvil attached to said first end surface of said C shaped frame;

a guide tube, said guide tube having a hexagonal shape, said guide tube having a first open end, a second open end, an inner surface and an outer surface, said outer surface of said guide tube attached to said second end surface of said C shaped frame;

a drive tube, said drive tube having a hexagonal shape, said drive tube having a first open end, a second open end, and an outer surface, said outer surface of said drive tube conformal in shape with said inner surface of said guide tube, said drive tube residing within said guide tube, a portion of said drive tube extending through said first open end of said guide tube, said outer surface of said drive tube in contact with said inner surface of said guide tube in at least two opposing locations;

a movable anvil, said movable anvil attached to and enclosing said first open end of said drive tube;

a threaded collar, said threaded collar attached to and enclosing said second open end of said drive tube, said threaded collar having a threaded bore;

a screw device, said screw device having a threaded portion extending through and engaging said threaded bore of said threaded collar;

a retaining collar, said retaining collar attached to and enclosing said second open end of said guide tube, said retaining collar operative to hold a position of said screw device fixed relative to said guide tube while allowing free rotation of said threaded portion of said screw device within said threaded bore of said threaded collar.

10. The clamping device as recited in claim 9, wherein said threaded portion of said screw device has left hand threads, operative to extend said movable anvil toward said fixed anvil with a clockwise rotation of said screw device.

11. The clamping device as recited in claim 9, wherein said threaded portion of said screw device has right hand threads, operative to extend said movable anvil toward said fixed anvil with a counter clockwise rotation of said screw device.

12. The clamping device as recited in claim 9, wherein said retaining collar is composed of two essentially identical halves.

13. The clamping device as recited in claim 12, wherein said retaining collar is welded to said guide tube.

14. The clamping device as recited in claim 9, wherein said fixed anvil and said guide tube are welded to said C shaped frame.

15. The clamping device as recited in claim 9, wherein said fixed anvil, said C shaped frame, and said guide tube are machined from a single block of metal.

* * * * *